(12) United States Patent
Hogan

(10) Patent No.: US 11,046,165 B2
(45) Date of Patent: Jun. 29, 2021

(54) VEHICLE HYDRAULIC POWER SYSTEM

(71) Applicant: Joseph Hogan, Argyle, TX (US)

(72) Inventor: Joseph Hogan, Argyle, TX (US)

( * ) Notice: Subject to any disclaimer, the term of this patent is extended or adjusted under 35 U.S.C. 154(b) by 0 days.

(21) Appl. No.: 16/262,329

(22) Filed: Jan. 30, 2019

(65) Prior Publication Data

US 2019/0160934 A1 May 30, 2019

Related U.S. Application Data

(63) Continuation-in-part of application No. 15/248,126, filed on Aug. 26, 2016, now abandoned.

(60) Provisional application No. 62/210,802, filed on Aug. 27, 2015.

(51) Int. Cl.
*B60K 6/12* (2006.01)
*F15B 1/26* (2006.01)
*F15B 11/08* (2006.01)

(52) U.S. Cl.
CPC ............... *B60K 6/12* (2013.01); *F15B 1/265* (2013.01); *F15B 11/08* (2013.01); *F15B 2211/212* (2013.01)

(58) Field of Classification Search
CPC ............... F15B 1/04; B60K 6/00; B60K 6/08
USPC .................................. 60/414; 180/305, 165
See application file for complete search history.

(56) References Cited

U.S. PATENT DOCUMENTS

| | | | | |
|---|---|---|---|---|
| 4,413,698 A | * | 11/1983 | Conrad | B60K 1/04 180/305 |
| 4,590,767 A | * | 5/1986 | Gardner, Jr. | F02G 1/04 180/165 |
| 10,583,707 B2 | * | 3/2020 | Kaskowicz | F15B 1/027 |

* cited by examiner

*Primary Examiner* — Michael Leslie
(74) *Attorney, Agent, or Firm* — Stonebridge IP, PLLC

(57) ABSTRACT

A method to use hydraulic pressure to power a vehicle includes providing a hydraulic fluid power system having a motor in communication with a hydraulic pump; a hose in communication with the hydraulic pump, the hose having a one way valve; a gear motor in fluid communication with the hose to receive hydraulic fluid therefrom; and an alternator to receive power from the gear motor and to transfer power to a battery for storage; operating the hydraulic pump via the motor such that hydraulic fluid is pumped through the hose to the gear motor; charging the battery with power generated by the gear motor and alternator; and using the battery for one or more components of the vehicle.

6 Claims, 8 Drawing Sheets

VEHICLE HYDRAULIC POWER SYSTEM

BACKGROUND

1. Field of the Invention

The present invention relates generally to hydraulic systems, and more specifically, to a hydraulic system adapted to power a vehicle.

2. Description of Related Art

Vehicles for transportation are well known in the art and are effective means to carry persons or items from one location to another. For example, FIG. 1 depicts a simplified view of a conventional vehicle 101 having a frame 103 along with two driver side wheels 105, 107. As shown, a wheel assembly 109, e.g., the wheel axle, and the like, are operably associated with wheel 107 and/or wheel 105. A motor 111 is used to provide power to the vehicle for movement.

One of the commonly known disadvantage of vehicle 101 is the costs associated with operating, e.g., fuel costs, the vehicle during travel. One less commonly known disadvantage is the wasted energy during acceleration, deceleration, and during travel.

Accordingly, there is a long-felt need to provide a more efficient vehicle that overcomes these and other problems associated with conventional vehicles.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
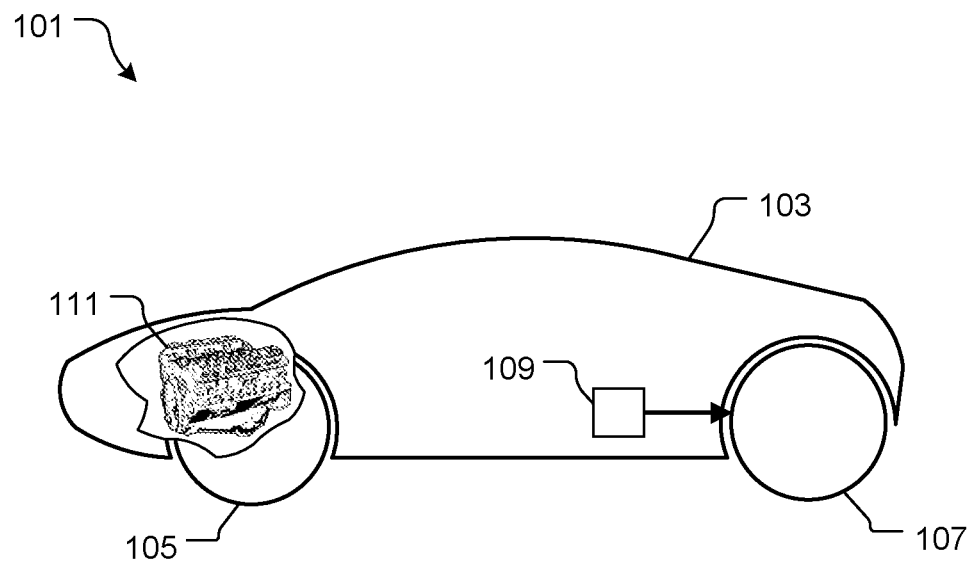
FIG. 1 is a simplified front view of a conventional vehicle.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicles. Specifically, the system and method of the present application provides rapid and effective means to utilize the wasted energy to power the vehicle during transit. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
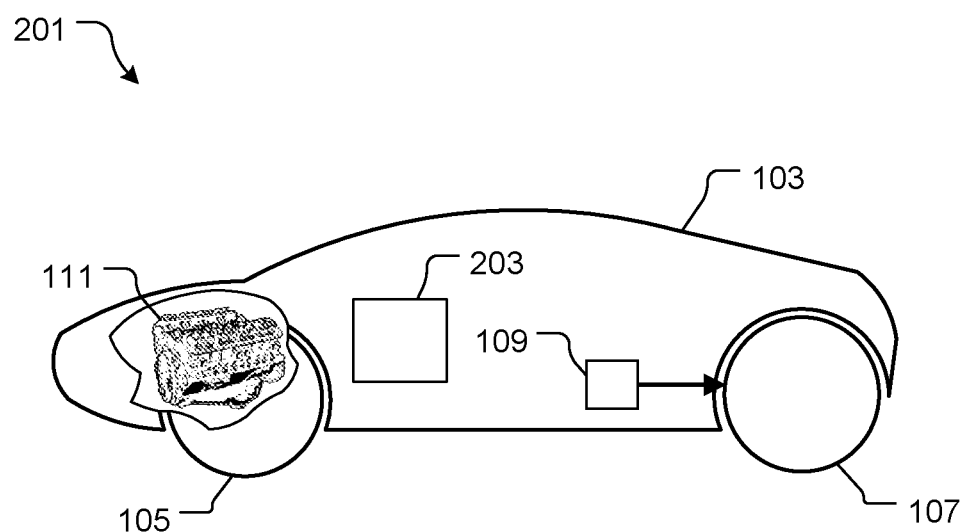
FIG. 2 is a simplified front view of a vehicle and method of use in accordance with a preferred embodiment of the present application.
Figure 3:
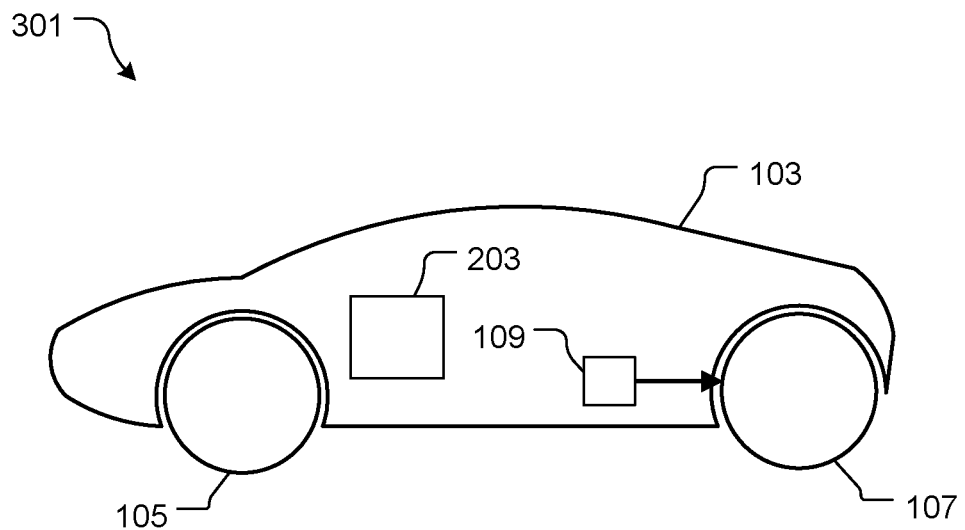
FIG. 3 is a simplified front view of a vehicle and method of use in accordance with an alternative embodiment of the present application.

Referring now to the drawings wherein like reference characters identify corresponding or similar elements throughout the several views, FIG. 2 depicts simplified side view of a vehicle 201 and method of use in accordance with a preferred embodiment of the present application. It will be appreciated that vehicle system 201 overcomes one of more of the above-listed problems commonly associated with the conventional assisted living programs.

In the contemplated embodiment, vehicle 201 includes one or more of a hydraulic system 203 operably associated with motor 111 and wheel assembly 109. In the contemplated embodiment, vehicle 201 utilizes the wasted energy from acceleration, deceleration, and during transit to supplement power to the motor 111. It will be appreciated that alternative embodiments, e.g., vehicle 301 could run solely with system 203 in lieu of utilizing the motor 111. The features of hydraulic system 203 are shown and described in detail with respect to FIG. 4.

Figure 4:
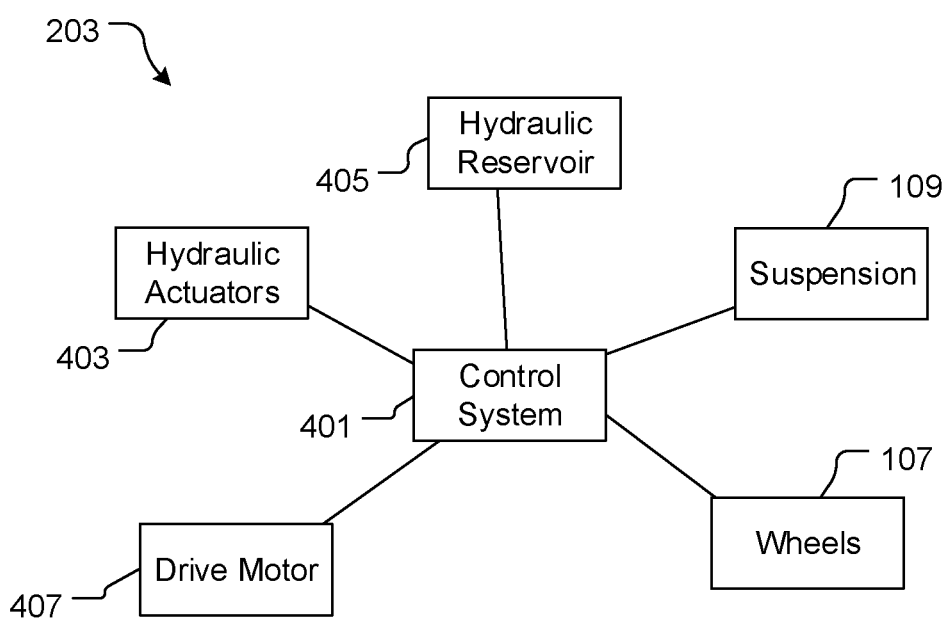
FIG. 4 is a schematic of a hydraulic system of the vehicle of FIGS. 2 and 3.

In FIG. 4, system 203 is shown having one or more of a control system 401 operably associated with at least one hydraulic actuator 403, a reservoir 405, and a drive motor 407. The devices of system 203 are shown operably associated with the vehicle wheel assembly 109 and wheels 107.

During use, the hydraulic actuators 403 and reservoir 405 are configured to gain and store pressurized hydraulic pressure during the slowing down, accelerating and up-and-down motion of the vehicle during travel. This feature is achieved by selectively positioning the actuators in locations and orientations that will received pressure from the weight of the vehicle. For example, the up-and-down motion could be associated with the suspension system of the vehicle. Accordingly, the actuators could be secured to the suspension in a vertical direction. Likewise, the actuators could be positioned in a horizontal direction relative to the wheel suspension system and could gain pressure with the decelerating and accelerating of the vehicle.

It will be appreciated that other embodiments could utilizes other types of devices to gain and store hydraulic power.

In one contemplated embodiment, the pressure gained from the actuators are controlled by control system 401 to drive the motor 407, which could be an existing drive motor 111 and/or a new drive motor that replaces motor 111.

It should be understood that the features discussed herein could be used with existing vehicle motor as a retrofit and/or installed during the manufacturing process. The size, shape, and location of system 203 is a design choice matching the size, weight, and performance of the vehicle. It should also be understood that the system 203 can be used on gasoline and/or electric vehicles and should not be limited to one or the other.

Figure 5:
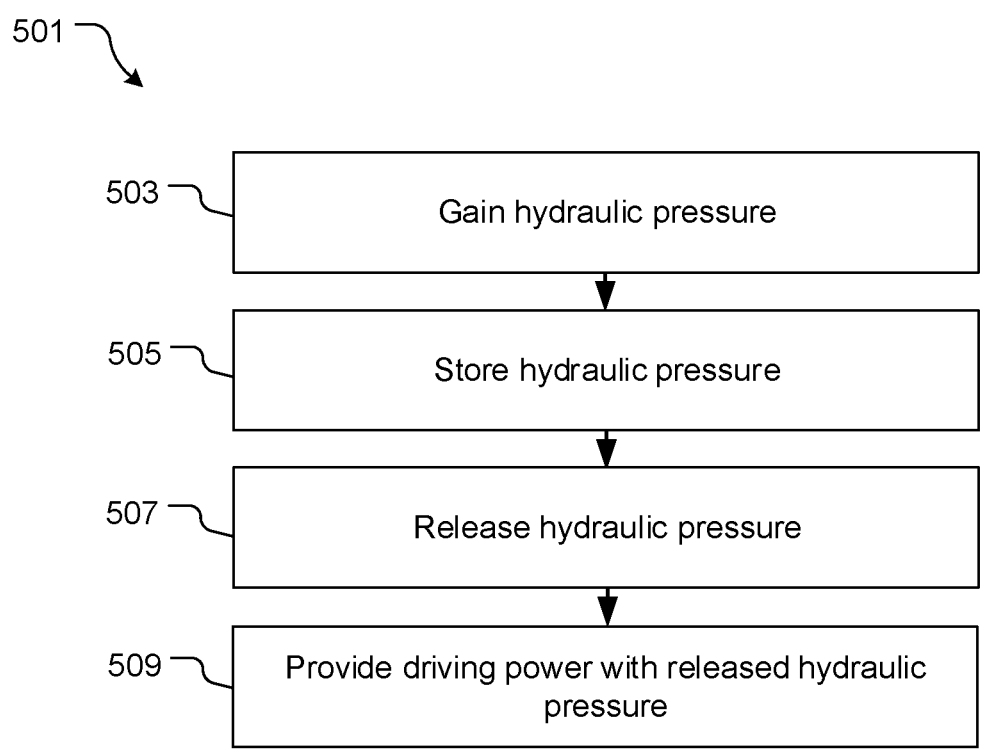
FIG. 5 is a flowchart depicting the preferred process.

The method of use is shown in FIG. 5, which depicts a flowchart 501 with the steps of gaining, storing, and releasing hydraulic pressure, as discussed above with one or more of the components of system 203. This process is depicted in boxes 503, 505, and 507. The next step includes providing the driving power to the motor via the released hydraulic pressure.

Figure 6:
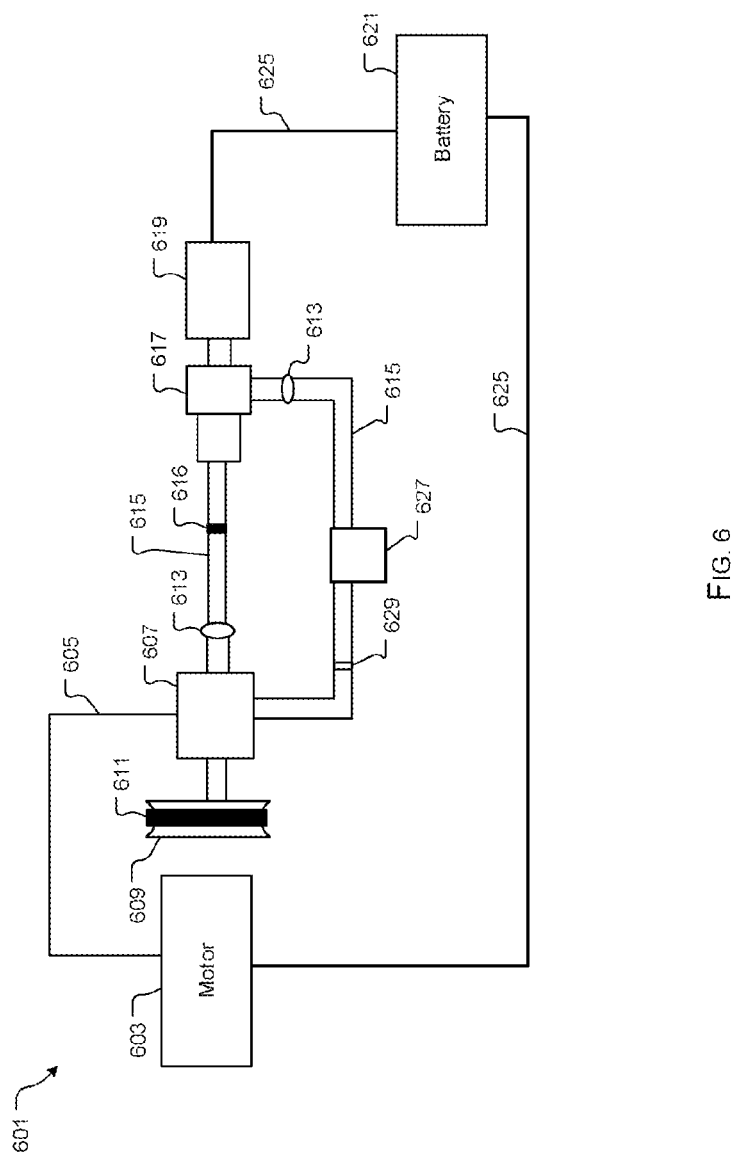
FIG. 6 is a schematic of a hydraulic power system in accordance with an alternative embodiment of the present application.

In FIG. 6, a schematic of an alternative embodiment of vehicle hydraulic power system 601 is shown. System 601 includes a vehicle motor 603 in electrical communication 605 with a hydraulic pump 607. The hydraulic pump 607 being in further communication with one or more pulleys/clutch pulleys 609 and belts/chains 611. It should be appreciated and understood that the size of the pulleys could depend on the size of the motor, weight and design of the vehicle, and type of hydraulic pump.

The hydraulic pump 607 is in further communication with a one way valve 613 and hose 615 that can optionally include an intensifier 616, the hose leading to a gear motor 617 in communication with an alternator 619. In this embodiment, the alternator 619 is in further communication with the vehicle battery 621, thereby being configured to charge the battery. The battery 621 configured to provide power back to motor 603 via one or more wires 625. As further shown, the gear motor 617 is in fluid communication with the hydraulic pump 607 via a hose 615 and can include another one way valve 613, a reservoir 627, and a filter 629. The filter should be placed in a location that has easy access to replace or clean.

In the embodiments discussed in FIGS. 6-10, hydraulic fluid leaves the pump through the hose, then through a one way valve, and can be split into a smaller hose or hoses, thereby creating a ram effect. The smaller hose can go to either a hydraulic gear motor to operate an alternator, and another hose can operate the generator if enough back up pressure is generated. In various embodiments, the gear moto can be attached to a generator/alternator with an adapter, a manufacturer connection, belts and pulleys, or anything similar. The fluid can then proceed through an in line filter and a reservoir. From the reservoir, the fluid travels through another one way valve, and back to a hydraulic pump. In some embodiments, an intensifier or pressure control valve may be used, depending on the flow needed to operate gear motors.

It will be appreciated that one of the primary objectives of the system discussed herein is to regulate hydraulic fluid with a vehicle, to charge batteries while driving. The system can include the motor of the vehicle to operate a hydraulic pump and the weight of the vehicle to compress cylinders. The system is configured to utilize fluid power and fluid flow through the gear motors, which are connected to a generator using one or more adapters, manufacturers connection, pulley and belt, chain, or any similar configuration. The specific method of use will vary according to the weight, size, and design of the vehicle, as well as the location, size, and number of all components being used in the exemplary embodiments can vary.

The following are merely exemplary embodiments to explain the components of the system and should not be construed as limiting.

Figure 7:
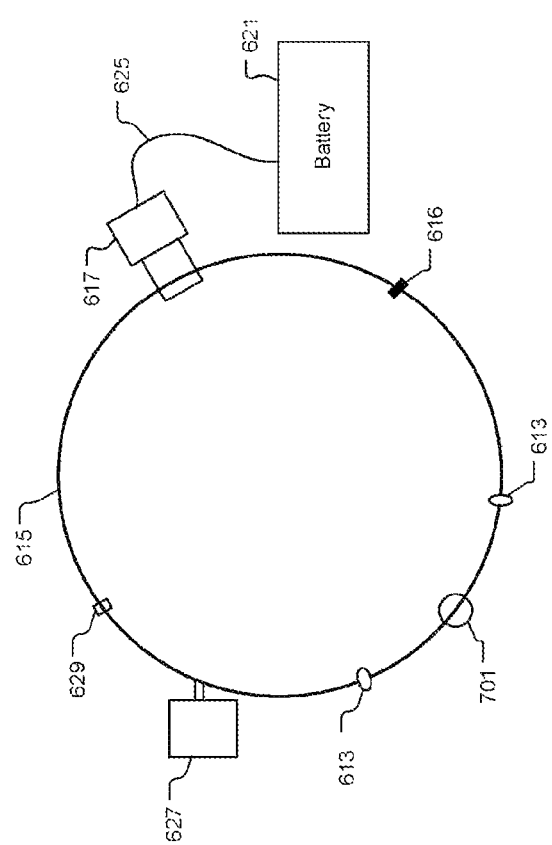
FIG. 7 is a schematic of closed loop hydraulic power system in accordance with an alternative embodiment of the present application.

In FIG. 7, a schematic depicts the closed loop feature of some embodiments of a hydraulic power system. The features discussed above are shown in fluid communication via hose 615. As shown, the system can further include a cylinder 701 within the closed loop. In this embodiment, each cylinder could use a separate small loop to keep all components close and compact. If a problem occurs in one area, all other cylinder to gear motor/generator combination, can keep working with each separate unit sending current to the battery. This method and system requires less hose and less fluid than other embodiments. The components and method of use, including cylinder size might vary at each location of hydraulic set up depending on the size and design of the vehicle. Fluid can return to the cylinder through the loop hydraulic system, with or without using the reservoir.

Figure 8:
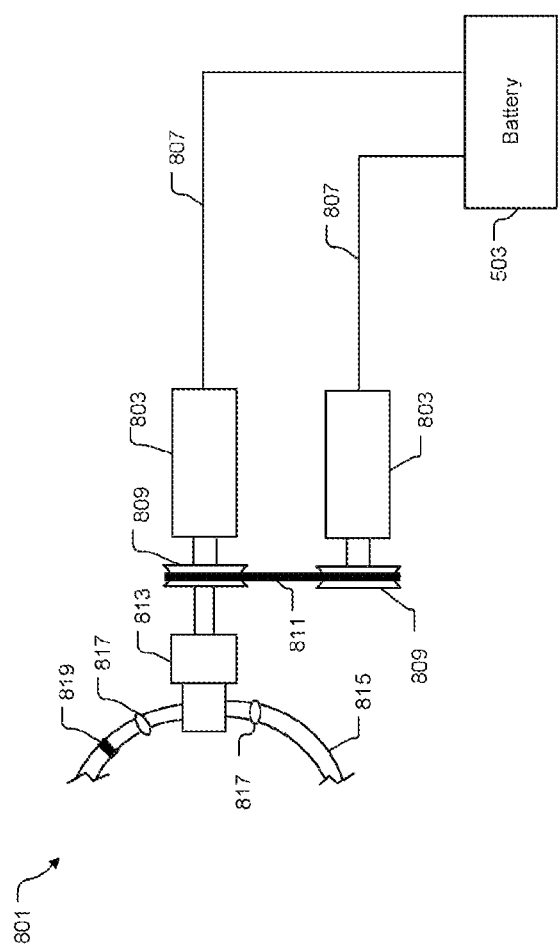
FIG. 8 is a schematic of a hydraulic power system in accordance with an alternative embodiment of the present application.

In FIG. 8, an alternative embodiment of a hydraulic power system 801 is shown. System 801 can include any of the features discussed above, however, in this embodiment, the system is shown having two generators 803 connected to a battery 805 via wire 807. Generators 803 are further connected to one or more pulleys/clutch pulleys 809 and belts/chains 811. In this embodiment, the gear motor 813 is further in fluid communication with a hose 815 having one way valves 817 and an optional intensifier 819.

Figure 9:
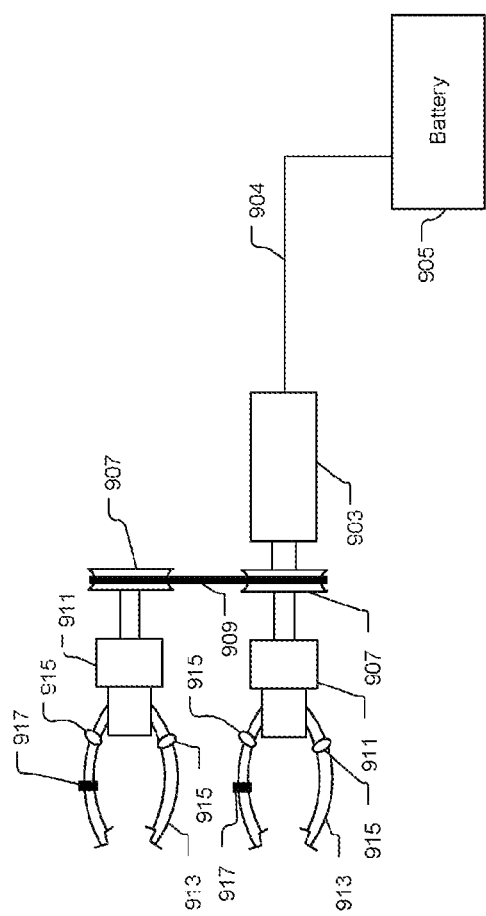
FIG. 9 is a schematic of a hydraulic power system in accordance with an alternative embodiment of the present application.

In FIG. 9, an alternative embodiment of a hydraulic power system 901 is shown. System 901 including a generator 903 wired 904 to a battery 905, generator 903 being in further communication with one or more pulleys/clutch pulleys 907 and belts/chains 909. This embodiment includes two gear motors 911 in fluid communication with hoses 913 having one way valves 915 and optional intensifiers 917.

The systems of FIGS. 8 and 9 can receive pressured fluid from a hydraulic pump or cylinder as discussed herein.

Figure 10:
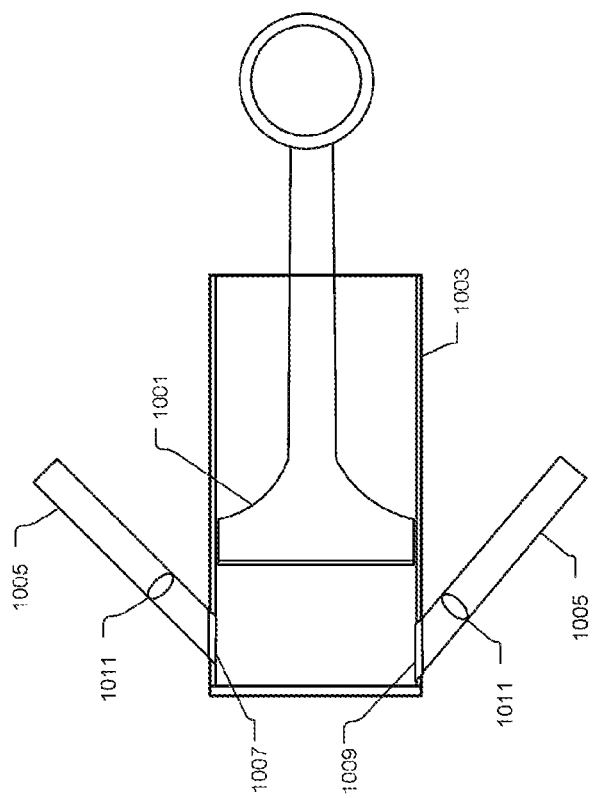
FIG. 10 is a simplified schematic of a cylinder for use with the various hydraulic power systems of the present application.

In FIG. 10, a piston 1001 is shown, having a cylinder 1003 with a fluid hose 1005, a fluid port inlet 1007, a fluid port outlet 1009, and one way valves 1011.

It should be appreciated that the vehicle's electric motor needs only a small amount of horsepower to operate the hydraulic pump, thereby making the system efficient. The amount of current used with the pump can replace power needed from the battery, as fluid turns the gear motor/alternator connection, and also operate lights, windows, seats, the radio, or anything electrical.

It should be appreciated that another object of the present invention is the user of the weight of a vehicle to pump fluid. The up and down movement of a vehicle, on uneven road surface lets fluid in and pushes out of the cylinder, into the hydraulic hose through one way valve, to a smaller line, and to the gear motor or motors. Gear motors can be connected to the generators or adapters, as discussed above, or manufacturing connection to best fit certain vehicles. A belt or chain or similar device can be used to connect generator to another generator if needed.

A one way valve can be used next to the cylinder on each side, wherein one port lets fluid in as the cylinder rod unit is expanding, then as weight of the vehicle pushes down, the pressure of the piston in the cylinder forces fluid out the other port. Fluid then goes through the one way valve, pushing into smaller line, and intensifier, then to the hydraulic gear motor that is attached to the generator. Fluid then starts the loop around to a reservoir, and back to the cylinder, which is operated by the up and down motion of the moving vehicle. The separation of vehicle's body from the chassis causes the cylinder to retract the piston, thereby allowing fluid back into the cylinder where weight of the vehicle forces fluid back to the gear motor.

It should be appreciated that the goal of the present invention is to utilize hydraulic fluid with a vehicle to charge batteries while driving. The features of each embodiment above can be interchanged as needed.

The particular embodiments disclosed above are illustrative only, as the embodiments may be modified and practiced in different but equivalent manners apparent to those skilled in the art having the benefit of the teachings herein.

It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle hydraulic power system comprising:
   a vehicle motor in electrical communication with a hydraulic pump in further fluid communication with a one-way valve;
   the one-way valve in further fluid communication with a cylinder and piston in further fluid communication with a gear motor, wherein up and down movement of the vehicle creates hydraulic fluid pressure via the cylinder and piston which is transmitted to the gear motor;
   the gear motor in further communication with an alternator/generator;
   the alternator/generator in further communication with a vehicle battery providing power to the vehicle battery.

2. The vehicle hydraulic system of claim 1, wherein the gear motor is in fluid communication with two alternators/generators.

3. The vehicle hydraulic system of claim 1, further comprising a second one-way valve and intensifier in fluid communication with the gear motor.

4. The vehicle hydraulic system of claim 1, wherein the hydraulic pump is in further communication with one or more pulleys or clutch pulleys and/or belts or chains.

5. The vehicle hydraulic system of claim 1, further comprising a fluid reservoir in fluid communication with the gear motor.

6. The vehicle hydraulic system of claim 5, further comprising a filter in fluid communication with the fluid reservoir.

* * * * *